(12) United States Patent
Oishi

(10) Patent No.: US 11,535,043 B2
(45) Date of Patent: Dec. 27, 2022

(54) IMAGE FORMING APPARATUS

(71) Applicant: CANON KABUSHIKI KAISHA, Tokyo (JP)

(72) Inventor: Erika Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/183,049

(22) Filed: Feb. 23, 2021

(65) Prior Publication Data

US 2021/0268812 A1 Sep. 2, 2021

(30) Foreign Application Priority Data

Feb. 28, 2020 (JP) .............................. JP2020-033414

(51) Int. Cl.
*B41J 11/66* (2006.01)
*B41J 11/00* (2006.01)

(52) U.S. Cl.
CPC ............ *B41J 11/008* (2013.01); *B41J 11/007* (2013.01); *B41J 11/663* (2013.01)

(58) Field of Classification Search
CPC ......... B41J 11/008; B41J 11/663; B41J 11/70; B41J 11/66; B41J 15/042
See application file for complete search history.

(56) References Cited

U.S. PATENT DOCUMENTS

| | | |
|---|---|---|
| 9,150,036 B2 | 10/2015 | Naruse |
| 9,718,290 B2 | 8/2017 | Kawai |
| 2011/0205277 A1* | 8/2011 | Hiroike ............... B41J 29/38 347/16 |
| 2014/0043387 A1 | 2/2014 | Maeda |
| 2015/0314618 A1 | 11/2015 | Ohashi |
| 2016/0214411 A1* | 7/2016 | Wakayama .......... H04N 1/0057 |
| 2021/0238000 A1* | 8/2021 | Ohashi ................ B26D 5/00 |

FOREIGN PATENT DOCUMENTS

| | | |
|---|---|---|
| JP | 2009-179048 A | 8/2009 |
| JP | 2011-131492 A | 7/2011 |
| JP | 2014-028457 A | 2/2014 |
| JP | 2017-065132 A | 4/2017 |
| JP | 2017-080917 A | 5/2017 |
| JP | 2017-177725 A | 10/2017 |

OTHER PUBLICATIONS

Extended European Search Report dated Jul. 29, 2021, in European Patent Application No. 21159008.8.

* cited by examiner

*Primary Examiner* — Scott A Richmond
(74) *Attorney, Agent, or Firm* — Venable LLP

(57) ABSTRACT

An image print apparatus capable of printing multiple pages on a rolled printing medium includes a conveyance unit that conveys the printing medium, a printing unit that prints on the printing medium, and a cutting unit that cuts out the printing medium. The conveyance unit performs a first conveyance operation to convey the printing medium by a predetermined length in a direction to discharge the printing medium and to stop the conveyance, which is carried out after completion of printing of one page by the printing unit and before settlement of a print start position of a next page, and a second conveyance operation including an operation to convey the printing medium in the direction to discharge until the print start position reaches a position of the printing unit, which is carried out after settlement of the print start position of the next page.

10 Claims, 15 Drawing Sheets

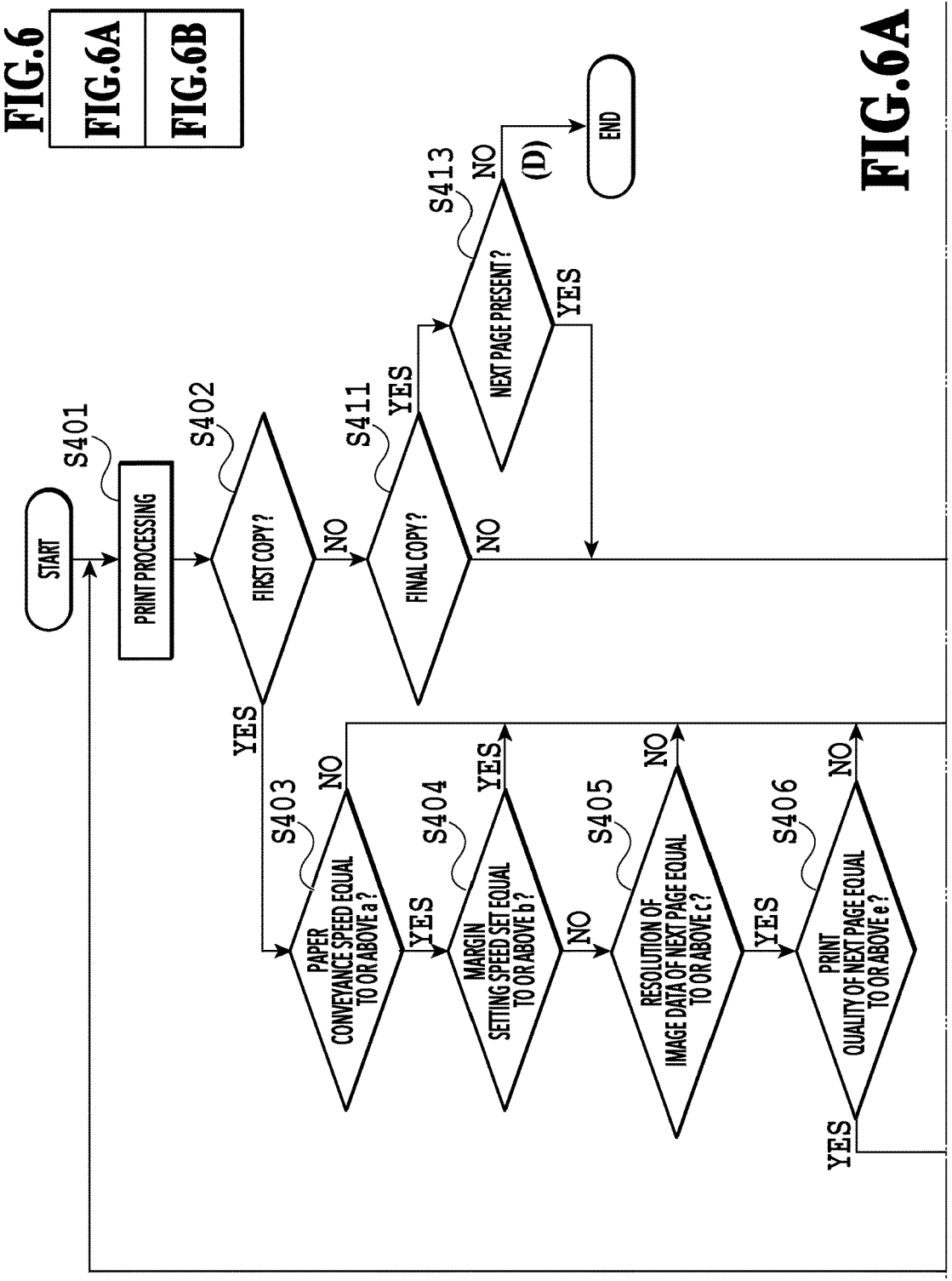

| | PAPER CONVEYANCE OPERATION BETWEEN PAGES IN CASE OF PRINTING MULTIPLE COPIES | |
|---|---|---|
| COPY BEING CURRENTLY PRINTED | IN CASE WHERE NEXT PAGE IS PRESENT | IN CASE WHERE NEXT PAGE IS NOT PRESENT |
| FIRST COPY | ROUTE A OR ROUTE B | ROUTE A OR ROUTE B |
| SECOND TO N-1-TH COPY | ROUTE C | ROUTE C |
| N-TH COPY | ROUTE C | ROUTE D |

FIG.7

IMAGE FORMING APPARATUS

BACKGROUND

Field

The present disclosure relates to conveyance control of an image forming apparatus.

Description of the Related Art

In a case of printing multiple pages with a conventional image forming apparatus configured to print on rolled paper, print data for one page is firstly printed upon receipt of a print job. Thereafter, the printed portion of the paper is cut out or cut off and the remaining paper is conveyed for printing the next page. Then the next page is printed. However, a cutter for cutting out the paper may be located at a downstream position in a paper conveying direction away from a printer carriage (hereinafter also referred to as a carriage) provided with a print head that performs printing. In this case, after the paper is cut out, the remaining paper has to be put back to a position where the carriage starts printing in order to print the next page. As a consequence, it takes time to start printing the next page. Given the circumstances, according to a method disclosed in Japanese Patent Laid-Open No. 2017-80917, a cutting operation is not carried out soon after completion of printing of one page but a paper conveyance operation for printing the next page is carried out instead. Hence, the next page is printed until a portion of the paper reaches a position of a cutter. Subsequently, the printing is suspended in a case where the portion of the paper reaches the position of the cutter. In this state, the paper is cut out and then the printing is resumed (this technique will be hereinafter referred to as "during-printing cutting"). In this way, this technique aims to improve print throughput by eliminating a returning operation of the paper after the cutting.

SUMMARY

An object of this disclosure is to improve print throughput in a case of printing multiple pages with an image forming apparatus.

An image forming apparatus according to an aspect of this disclosure provides an image forming apparatus being capable of printing multiple pages on a rolled printing medium. The image forming apparatus includes a conveyance unit that conveys the printing medium, a printing unit that prints on the printing medium, and a cutting unit that cuts out the printing medium. Here, the conveyance unit performs a first conveyance operation to convey the printing medium by a predetermined length in a direction to discharge the printing medium and to stop the conveyance, which is carried out after completion of printing one page by the printing unit and before settlement of a print start position of the next page, and a second conveyance operation including an operation to convey the printing medium in the direction to discharge until the print start position reaches a position of the printing unit, which is carried out after settlement of the print start position of the next page.

Further features of the present invention will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIGS. 6A and 6B comprise a flowchart showing paper conveyance processing between pages in multiple copy printing according to the embodiment;

FIG. 7 is a table showing a relation between a copy being printed and a type of a paper conveyance operation between printed pages according to the embodiment;

DESCRIPTION OF THE EMBODIMENTS

According to the method disclosed in Japanese Patent Laid-Open No. 2017-80917, the paper conveyance operation for printing the next page cannot be started unless a print start position of the next page, that is, a target position of paper conveyance is settled irrespective of whether or not the during-printing cutting is carried out. As a consequence, even in the case of carrying out the during-printing cutting, the image forming apparatus may be transitioned to a standby state during a period from completion of printing one page to settlement of the print start position of the next page.

An embodiment of this disclosure will be described below in detail with reference to the drawings. It is to be noted that the following embodiment is not intended to limit the scope of this disclosure. It is to be also understood that this disclosure does not necessarily require a combination of all of the features described in the embodiment. This disclosure also includes various modified embodiments within a range not departing from the gist of this disclosure. Meanwhile, this disclosure also encompasses a configuration obtained by partially combining the embodiments described below.

Figure 1:
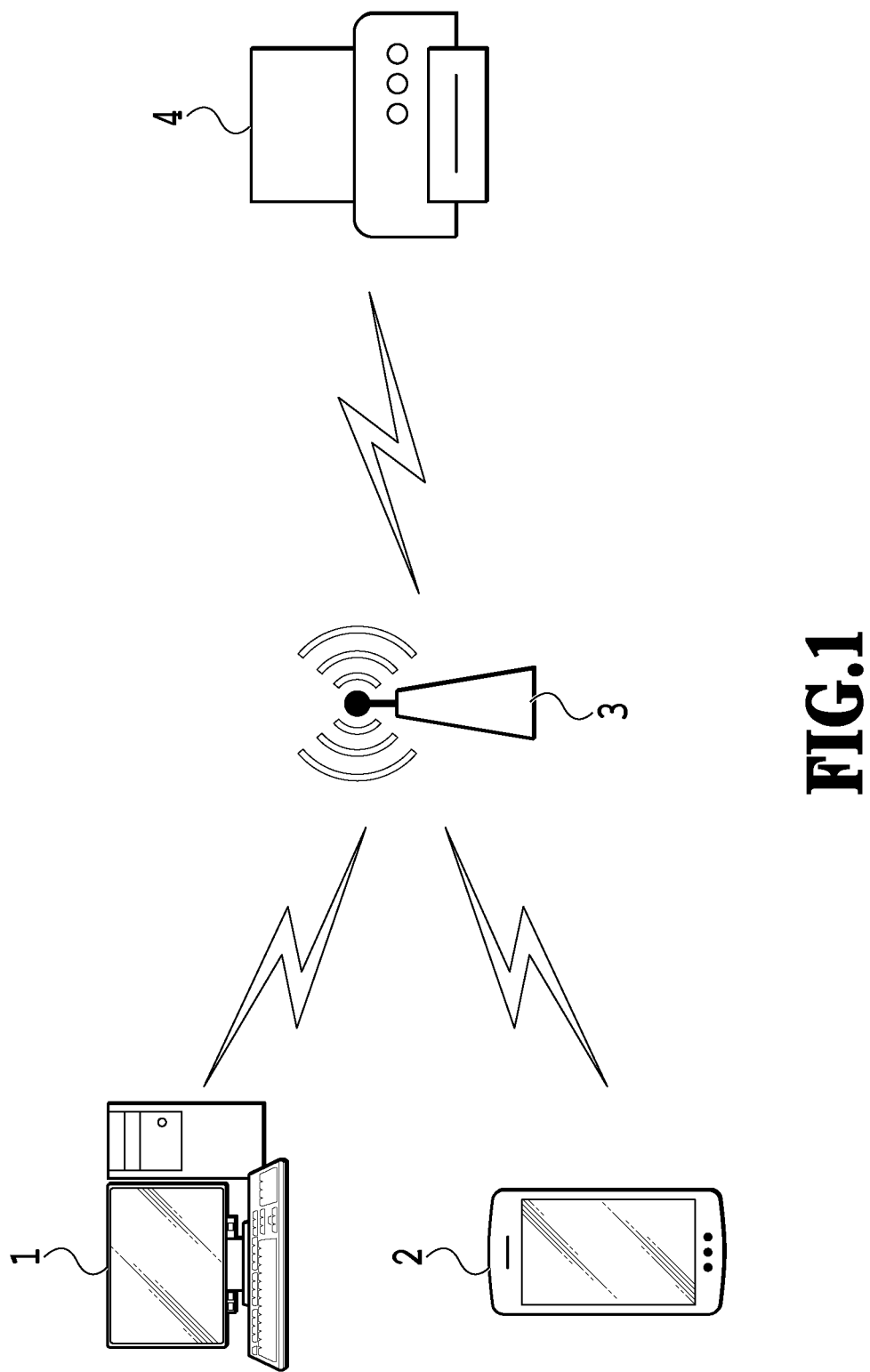
FIG. 1 is a schematic diagram showing a relation between an image forming apparatus and externally connected devices according to an embodiment.

FIG. 1 is a schematic diagram showing a relation between an image forming apparatus and externally connected devices in the embodiment.

An image forming apparatus 4 is connected to externally connected devices in such a way as to be communicable with each other through an interface (such as USB) for the externally connected devices or through a network 3. For example, a print job is transferred from an externally connected device such as a personal computer 1 and a smartphone 2 to the image forming apparatus 4 through the network 3. The network 3 can be implemented in accordance with a desired communication system regardless of whether the network is wired or wireless. Note that the numbers of image forming apparatuses 4 and the externally connected devices are not limited.

Figure 2:
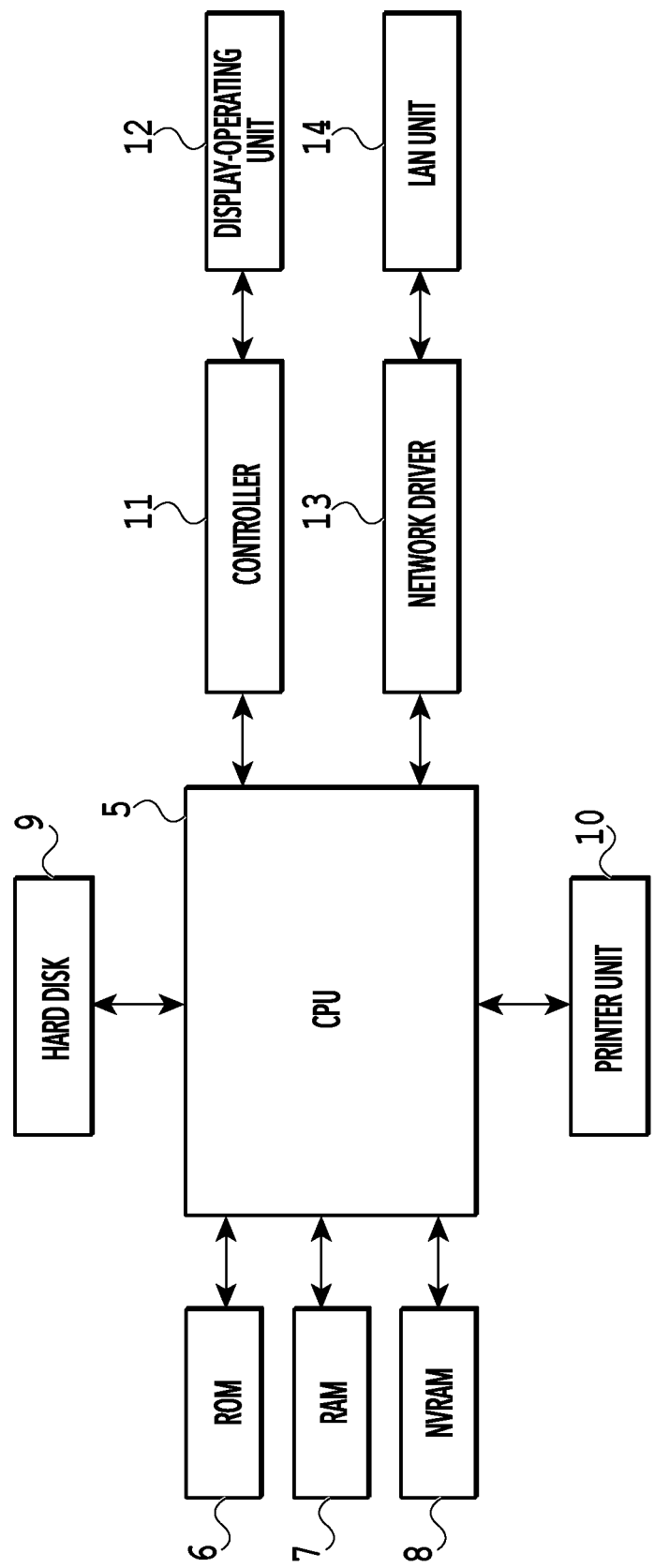
FIG. 2 is a block diagram showing a hardware configuration of the image forming apparatus according to the embodiment.

FIG. 2 is a block diagram showing a hardware configuration of the image forming apparatus according to the embodiment.

The image forming apparatus 4 includes a CPU 5, a ROM 6, a RAM 7, a non-volatile RAM (NVRAM) 8, a hard disk 9, a printer unit 10, a controller 11, a display-operating unit 12, a network driver 13, and a LAN unit 14.

The CPU (central processing unit) 5 reads a program stored in the ROM 6 or the hard disk 9 and loads the program into the RAM 7 and then executes the program, thereby controlling the image forming apparatus 4. The RAM 7 functions as a temporary storage area of the program read out by the CPU 5. The NVRAM 8 is a non-volatile memory which stores records of various data necessary for maintenance of the image forming apparatus 4, information concerning a print target image, and the like. The hard disk 9 stores programs and images to be printed by the printer unit 10.

The display-operating unit 12 includes user interfaces such as a liquid crystal display (LCD) unit, LEDs (light emitting diodes), keys, and a touch panel. A user performs an execution operation and a setting operation of respective functions of the image forming apparatus 4 through the display-operating unit 12. The controller 11 controls an operation state and display contents of the image forming apparatus 4.

The LAN unit 14 communicates with the externally connected devices through the interfaces for the externally connected devices or through the network 3. The CPU 5 can exchange execution commands and data with the externally connected devices connected to the LAN unit 14 through the network driver 13. In the case where the printer unit 10 performs printing, for example, the CPU 5 can receive a print job from any of the externally connected devices through the network driver 13.

The printer unit 10 forms an image based on print data on a print sheet (a printing medium) such as a roll of paper (hereinafter also referred to as rolled paper). The printing medium may be any of rolled paper or sheets that include fabrics, plastic films, and the like.

Figure 3:
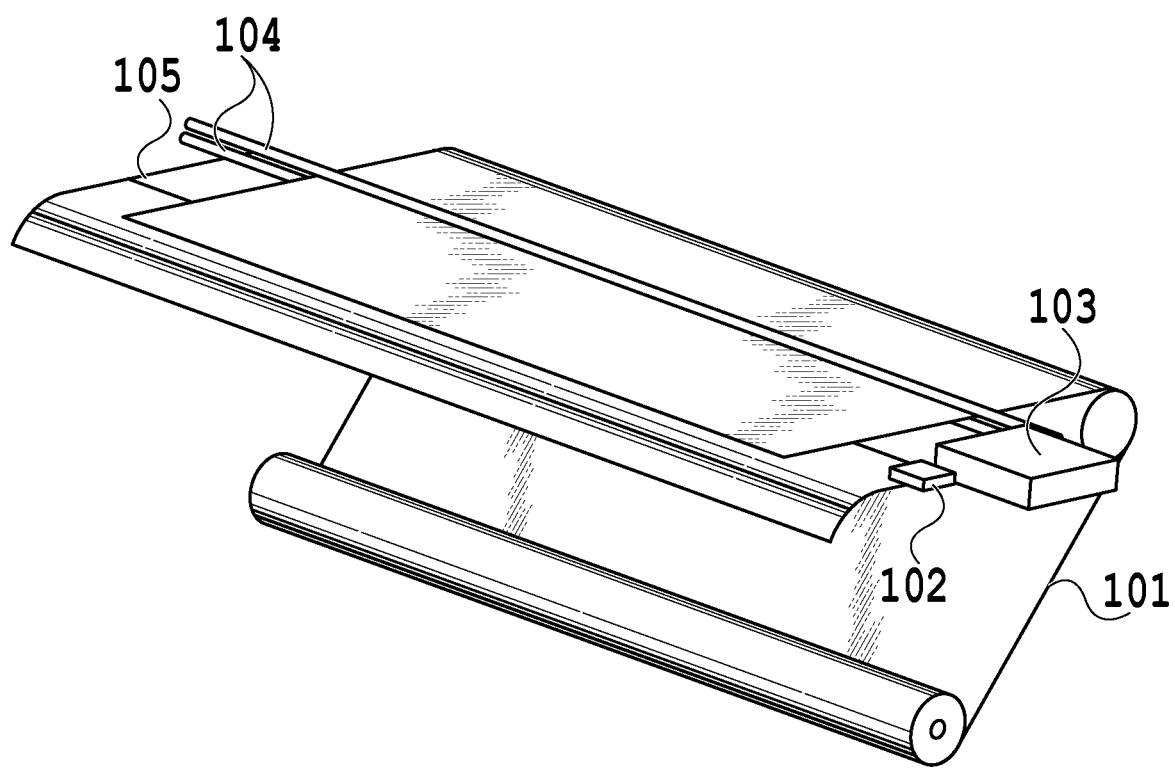
FIG. 3 is a schematic diagram showing a paper installation structure of the image forming apparatus according to the embodiment.

FIG. 3 is a schematic diagram showing a paper installation structure of the image forming apparatus according to the embodiment. The image forming apparatus includes a cutter unit 102, a carriage 103, conveyance rollers 104, and a platen 105.

Rolled paper 101 being the printing sheet is sandwiched between the conveyance rollers 104 and is fed or rewound along with rotation of the conveyance rollers 104. In the meantime, the rolled paper 101 is supported from below by the platen 105.

The carriage 103 includes a not-illustrated print head and rolled paper 101 is printed by ejecting inks from the print head. Meanwhile, the carriage 103 may include ink tanks that store the inks to be supplied to the print head. The carriage 103 reciprocates from a right side to a left side and from the left side to the right side in FIG. 3. In this embodiment, the right side of FIG. 3 where the carriage 103 is provided will be referred to as a reference side while the left side thereof will be referred to as a non-reference side.

The cutter unit 102 cuts out the rolled paper 101 while traveling from the reference side to the non-reference side.

A traveling direction of the carriage 103 will be referred to as a main scanning direction while a direction of feeding and rewinding the rolled paper 101 by using the conveyance rollers 104 (that is, a conveyance direction of the rolled paper 101) will be referred to as a sub-scanning direction.

Figure 4:
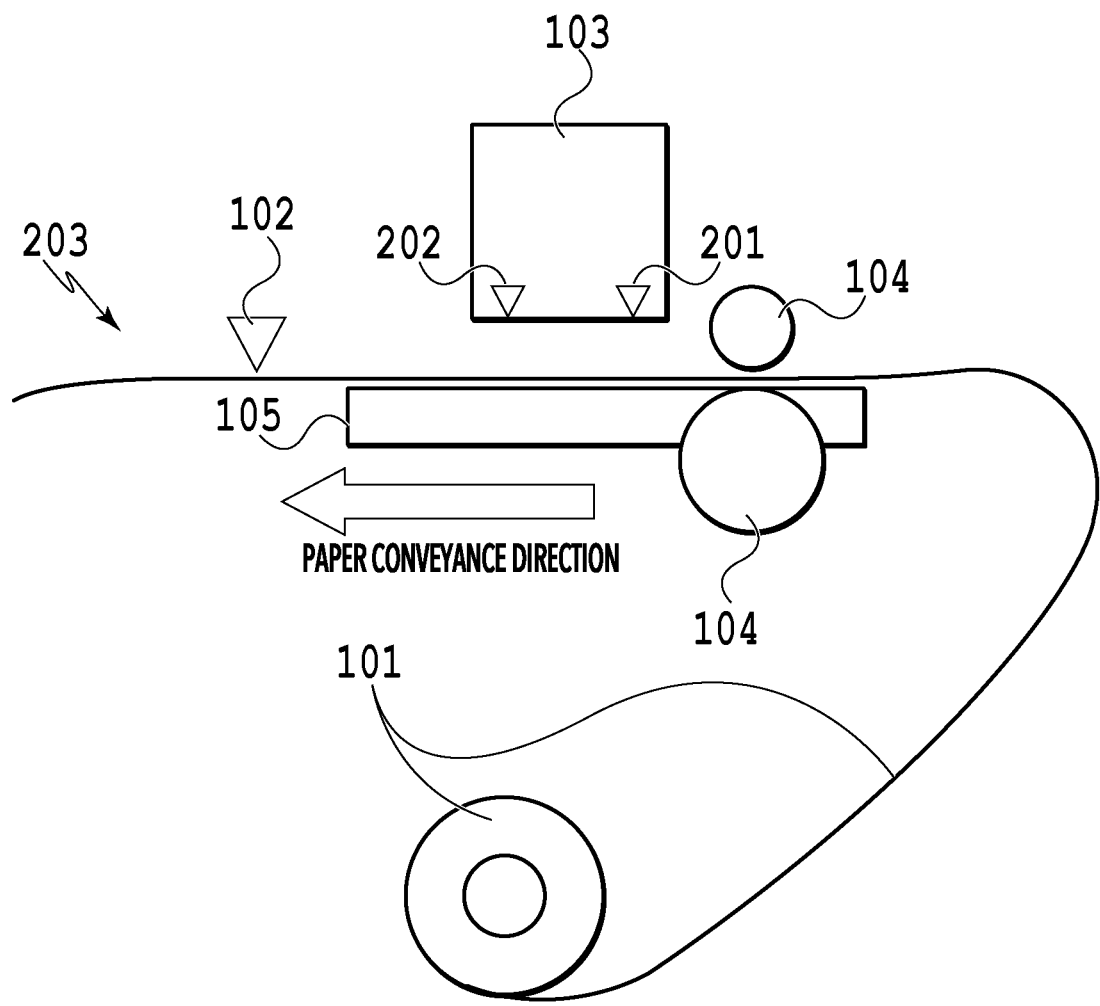
FIG. 4 is a schematic diagram showing a paper conveyance structure of the image forming apparatus according to the embodiment.

FIG. 4 is a schematic diagram showing a paper conveyance structure of the image forming apparatus according to the embodiment. FIG. 4 shows a state where the rolled paper 101 is installed on the image forming apparatus. The rolled paper 101 is sandwiched between the conveyance rollers 104 and is fed in a paper conveyance direction (a direction indicated with an arrow) by rotation of the conveyance rollers 104. In this embodiment, a side of a paper conveyance path close to a place where the rolled paper 101 is held in a rolled state will be defined as an upstream side while a paper discharge port 203 side will be defined as a downstream side. The rolled paper 101 is supported from below by the platen 105.

The image forming apparatus further includes the carriage 103 and the cutter unit 102. The carriage 103 is provided with the print head and the printing is performed by ejecting the inks from nozzles loaded on the print head. In the print head, the nozzle located on the most upstream side will be referred to as a most upstream nozzle 201 while the nozzle located on the most downstream side will be referred to as a most downstream nozzle 202.

In a case where the during-printing cutting is not carried out in the course of printing multiple pages (in other words, in a case of cutting before printing the next page), the rolled paper 101 is conveyed in the paper conveyance direction to a cutter position after completion of printing of one page. Then, a cutting operation is carried out and the rolled paper 101 is conveyed (rewound) in an opposite direction to the paper conveyance direction to the print start position of the next page. Thereafter, the printing of the next page is started.

On the other hand, in a case where the during-printing cutting is carried out (in other words, in a case of cutting in the middle of printing the next page), the printing of the next page is continuously carried out following completion of printing of one page without cutting the rolled paper 101. Then, as a leading end position of the next page reaches the position of the cutter along with the printing of the second page, the printing is suspended to cut out the rolled paper 101 and then the printing is resumed. In this way, an improvement in print throughput is expected.

Figure 5:
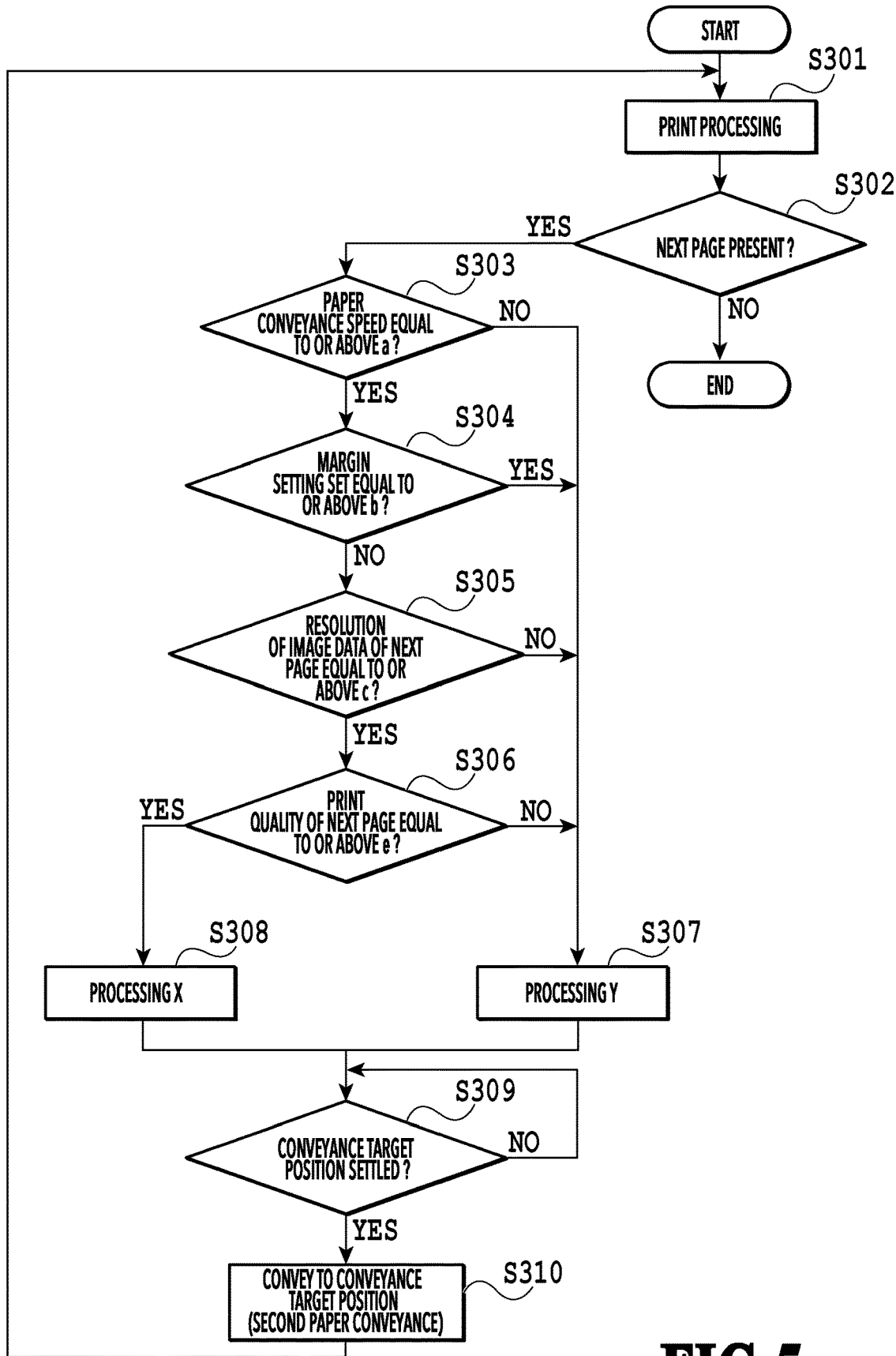
FIG. 5 is a flowchart showing paper conveyance processing between pages according to the embodiment.

FIG. 5 shows a flowchart of paper conveyance processing between pages according to the embodiment. The image forming apparatus starts processing shown in FIG. 5 by executing the print job. The print job includes a print job header section that stores a printing format and information on the print job, and an image data section that stores the print data targeted for printing.

The series of processing shown in the flowchart is carried out by causing the CPU 5 of the image forming apparatus 4 to read a program stored in the ROM 6 or the hard disk 9, to load the program into the RAM 7, and then to execute the program. Alternatively, functions of all or part of the steps in the flowchart may be implemented by using hardware such as an ASIC and an electronic circuit. A sign "S" used in the description of the flowchart represents a "step" in the flowchart. The same applies to other flowcharts as well.

First, the CPU 5 executes print processing for one page in S301. Specifically, the CPU 5 generates print data inclusive of the image data based on the print job, and instructs the printer unit 10 to print the print data. The CPU 5 conveys the rolled paper 101 in the sub-scanning direction (that is, in the paper conveyance direction) to the print start position of the one page and ejects the inks while driving the carriage 103, which loads the print head filled with the inks, in the main scanning direction. Thereafter, the one page is printed on the rolled paper 101 while repeating the conveyance of a predetermined amount of the rolled paper 101 and the drive of the carriage 103 sequentially.

After the print processing for the one page is completed, the CPU 5 determines in S302 whether or not there is the next page to be printed. Specifically, the CPU 5 determines whether or not the print job includes information on the next page. The paper conveyance processing is terminated in the case where there is not the next page. On the other hand, the CPU 5 proceeds to S303 in a case where there is the next page.

The CPU 5 performs four types of determination processing in S303, S304, S305, and S306. The four types of determination processing make it possible to compare time T1 spent until settlement of a conveyance target position with conveyance time T2 required for processing to convey the leading end position of the next page (that is, the cutting position of the paper) provided on the rolled paper 101 to the most downstream nozzle of the carriage. Here, the conveyance target position represents the print start position of the next page.

Here, the cutting position of the paper can be settled based on the print data on the current page, or more specifically, a paper length of the current page. Processing Y in S307 is processing to create data of the next page during a period before the conveyance target position is settled. On the other hand, processing X in S308 is processing to carry out first paper conveyance processing in parallel with the processing to create the data of the next page during a period before the conveyance target position is settled. Note that this parallel processing only needs to be processed in parallel at least in a certain period of time, and points of start and points of end of the conveyance processing and the data creation processing do not always have to coincide with one another. The first paper conveyance processing will be described later with reference to FIG. 9 and FIG. 11. The processing to settle the conveyance target position is carried out by the CPU 5 based on results of determination in S303 to S306 described below. Accordingly, the processing to settle the conveyance target position is started after obtaining the results of determination in S303 to S306 described below.

In response to a result of comparison between the time T1 before settling the conveyance target position with the conveyance time T2, the CPU 5 determines which one of the processing X and the processing Y is to be carried out. The data creation processing of the next page in the processing X is the same processing as the data creation processing in the processing Y. Here, the order of execution of the four types of determination may be any order. Meanwhile, determination of one or more types in S303, S304, S305, and S306 may be omitted. Alternatively, the CPU 5 may proceed to any of the processing X or the processing Y without carrying out these types of determination at all. For example, in the case of carrying out the during-printing cutting, the processing X may be carried out every time the next page is present. In other words, even if the processing X is always s carried out every time there is the next page in a during-printing cutting mode, it is possible to achieve an effect to improve the print throughput by reducing standby time without carrying out the determination in S303 to S306.

In S303, the CPU 5 determines whether or not a paper conveyance speed is equal to or above a predetermined value a. The predetermined value a is set to 76.2 mm/second, for example, but is not limited only to this value. The speed of 76.2 mm/second is a speed which is slightly faster than an ordinary paper conveyance speed in the certain image forming apparatus mentioned above. Meanwhile, a value of the paper conveyance speed preset to the image forming apparatus in accordance with the type of paper, operation timing, and the like may be obtained and used as the paper conveyance speed, for example. On the other hand, a specified value or an actually measured value may be used instead. In the case where the paper conveyance speed is below the predetermined value a (that is, in the case of a low paper conveyance speed), it is highly likely that the time T2 required for the first paper conveyance processing (S308) becomes longer than the time T1 spent until settlement of the conveyance target position, because the slower the paper conveyance speed is the longer the time for conveying the paper becomes. Accordingly, in the case where the paper conveyance speed is below the predetermined value a in S303 (that is, in the case of the low paper conveyance speed), the CPU 5 proceeds to S307 to perform the processing Y. On the other hand, in the case where the paper conveyance speed is equal to or above the predetermined value (that is, in the case of the high paper conveyance speed), the CPU 5 proceeds to S304 in order to perform the subsequent processing.

In S304, the CPU 5 determines whether or not a margin setting (that is, an amount of a set margin) of the next page to be printed is equal to or above a predetermined value b. The margin setting is included in the print job and either a common value or an individual value is set to each of all pages to be printed. Concerning the margin setting, the CPU 5 may cause the display-operating unit 12 to display an input screen in FIG. 14 to be described later, so that the value can be set by operating the display-operating unit 12. The predetermined value b is set to 20 mm, for example, but is not limited only to this value. The value of 20 mm represents an example of values settable by the display-operating unit 12 of the above-described image forming apparatus. Meanwhile, the margin may be set by using an externally connected device. In the case where the margin setting is equal to or above the predetermined value b, it is highly likely that the time T2 required for the first paper conveyance processing (S308) becomes longer than the time T1 spent until settlement of the conveyance target position, because the larger the margin setting is the longer the time for conveying the paper becomes. Accordingly, in the case where the margin setting is equal to or above the predetermined value b in S304 (that is, in the case of the long conveyance time), the CPU 5 proceeds to S307 to perform the processing Y. On the other hand, in the case where the margin setting of the page to be printed is below the predetermined value b, the CPU 5 proceeds to S305 to perform the subsequent processing.

In S305, the CPU 5 determines whether or not resolution of the image data of the next page to be printed is equal to or above a predetermined value c. The resolution of the image data is included in the print job and is acquired by the CPU 5. The predetermined value c is set to 600 dpi, for example, but is not limited only to this value. The value of 600 dpi represents an example of resolution printable with the above-described image forming apparatus. In the case where the resolution of the image data is below the predetermined value c, it is highly likely that the time T2 required for the first paper conveyance processing (S308) becomes longer than the time T1 spent until settlement of the conveyance target position, because the resolution of the image data affects the time T1 spent until settlement of the conveyance target position and the higher the resolution is the longer the time T1 spent until settlement of the conveyance target position becomes. Accordingly, in the case where the resolution is below the predetermined value c in S305 (that is, in the case of the short time spent until settlement of the conveyance target position), the CPU 5 proceeds to S307 to perform the processing Y. On the other hand, in the case where the resolution of the image data is equal to or above the predetermined value, the CPU 5 proceeds to S306 to perform the subsequent processing.

In S306, the CPU 5 determines whether or not print quality of the next page to be printed is equal to or above a predetermined value e. The print quality is included in the print job and there are "fast", "standard", and "high" modes and the like. The predetermined value e is set to a value corresponding to the "standard" mode, for example, but is not limited only to this value. Values of the print quality corresponding to the respective modes are gradually increased in the order of the "fast", "standard", and "high" modes. In the case where the print quality is below the predetermined value e (which corresponds to the print quality of the "fast" mode in this example), it is highly likely that the time T2 required for the first paper conveyance processing (S308) becomes longer than the time T1 spent until settlement of the conveyance target position, because the smaller the value of the print quality is the shorter the time T1 spent until settlement of the conveyance target position becomes. Accordingly, in the case where the print quality is below the predetermined value e in S306 (that is, in the case of the short time spent until settlement of the conveyance target position), the CPU 5 proceeds to S307 to perform the processing Y. On the other hand, in the case where the print quality is equal to or above the predetermined value (in the case of the print quality of the "standard" or "high" mode in this example), the CPU 5 proceeds to S308 to carry out the processing X.

The CPU 5 carries out the processing X in S308. Specifically, the CPU 5 performs the processing to create the data of the next page in parallel with the first paper conveyance processing. Note that a predetermined length of the rolled paper 101 is conveyed in the paper conveyance direction in the first paper conveyance processing. The predetermined length is a length which is shorter than a conveyance length (a conveyance distance) in the paper conveyance direction to a point where the print start position of the next page reaches the position of the print head. In other words, this is a length with which the position of the print head is assumed not to exceed the print start position of the next page (a conveyance length with which the print start position is assumed to be located upstream of the print head) even in a state where the print start position of the next page is yet to be settled. In this length, it is not necessary to convey the rolled paper 101 in the opposite direction. This length may be preset or set based on a cutting position of the first page, because the cutting position of the first page does not exceed the print start position of the second page. Accordingly, the rolled paper 101 may be conveyed to such a position that the cutting position of the first page of the rolled paper 101 reaches the print head, for example. To be more precise, the rolled paper 101 may be conveyed to such a position that the cutting position of the first page of the rolled paper 101 reaches the most downstream nozzle of the carriage.

Instead of or in addition to the above-described four types of determination processing, a line speed of transmission of the print job may be determined, for example. Concerning the line speed, a time period from a point of reception of first data to a point of reception of subsequent data may be measured and used for the determination, for example. As the line speed becomes slower, the time T1 spent until settlement of the conveyance target position becomes longer.

Meanwhile, borderless printing may be available or not available depending on settings of the print paper. Accordingly, a determination may be made while taking into account this availability. Unlike the cutting operation in the normal continuous printing, the paper needs to be cut out at two positions, namely, a print end position (reference code m in FIG. 12) of the first page and a print start position (reference code g in FIG. 12) of the second page in the borderless printing, for example. Given the situation, this embodiment may not be carried out in this case. Alternatively, in the paper conveyance operation in the bordered printing, the paper may be conveyed to such a position that takes borders into account.

The CPU 5 proceeds to S309 after completion of the processing X or the processing Y.

In S309, the CPU 5 determines whether or not a conveyance target position (that is, the print start position of the next page) is settled in a conveyance operation (hereinafter referred to as second paper conveyance processing) of the rolled paper 101 to be carried out in order to start printing of the next page. The conveyance target position is determined by the CPU 5 based on the next page to be printed. The determination processing in this step will be described later with reference to FIG. 11. In a case where the conveyance target position is yet to be settled, the CPU 5 will repeat this determination until the conveyance target position is settled. In the case where the conveyance target position is settled, the CPU 5 proceeds to S310 to carry out the second paper conveyance processing to convey the rolled paper 101 to the conveyance target position. Specifically, the rolled paper 101 is conveyed such that the print start position of the next page reaches the position of the print head. The second paper conveyance processing will be described later with reference to FIG. 9 and FIG. 11. Subsequently, the paper conveyance processing returns to S301 and this processing is repeated.

Note that the above-described four types of determination processing may be carried out every time the next page is printed or may be carried out just once and the results of determination may be used for the following pages.

As described above, according to the embodiment, it is possible to convey the paper to a position described below as conveyance in a first stage after completion of the print processing of the one page and before the settlement of the conveyance target position of the next page to be printed. Specifically, as the conveyance in the first stage, the rolled paper 101 can be conveyed such that the predetermined position (such as the cutting position of the current page) on the rolled paper 101 reaches the position of the print head. In other words, the paper is conveyed to such a position that does not affect the printing of the next page before the conveyance target position of the next page is settled. Thus, it is possible to reduce conventional standby time and to diminish the time required for the conveyance of the paper after the settlement of the conveyance target position of the next page to be printed. Accordingly, the print throughput can be improved.

Figure 6B:
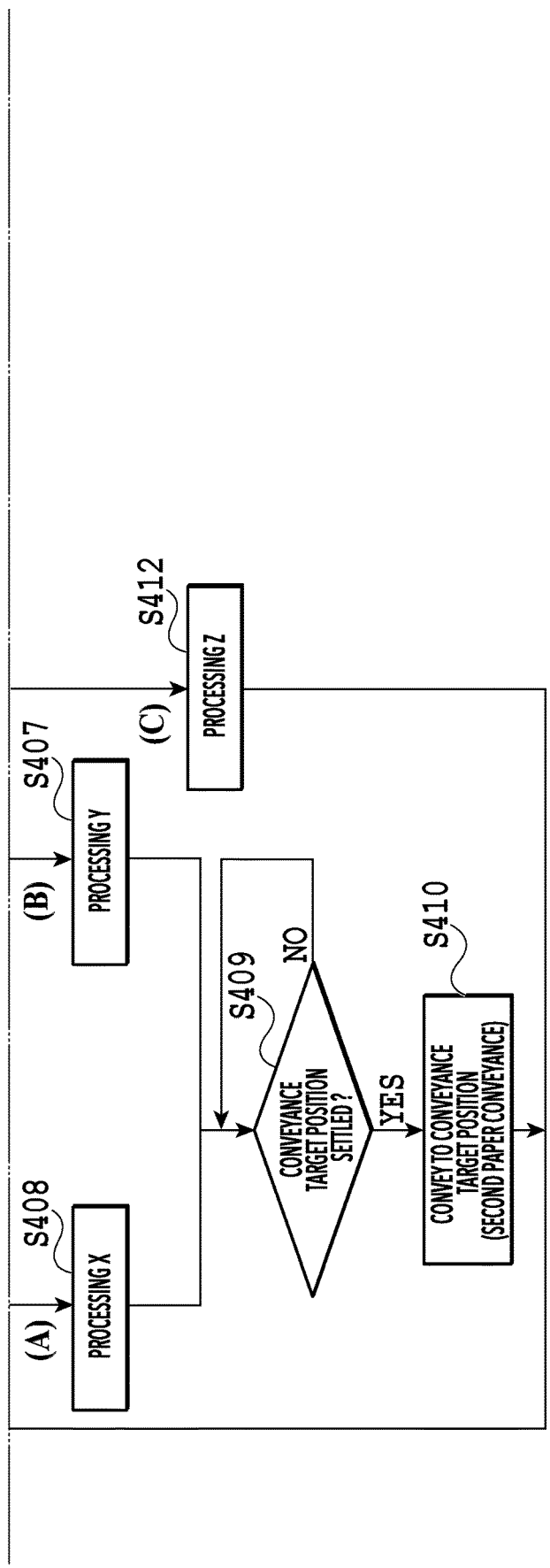

FIG. 6 is a diagram showing the relationship of FIGS. 6A and 6B. FIGS. 6A and 6B show a flowchart of the paper conveyance processing between pages in multiple copy printing according to the embodiment. The image forming apparatus starts the processing shown in this flowchart by executing a print job corresponding to the multiple copy printing.

In this flowchart, the processing in S401 and from S403 to S410 is the same as the processing in S301 and from S303 to S310 of FIG. 5 and explanations thereof will therefore be omitted.

In this paper conveyance processing, after completion of the print processing corresponding to one page, the CPU 5 determines in S402 whether or not the paper conveyance processing corresponds to the printing of a first copy. The CPU 5 proceeds to S411 in the case where the paper conveyance processing does not correspond to the printing of the first copy. On the other hand, the CPU 5 proceeds to S403 in the case where the paper conveyance processing corresponds to the printing of the first copy and then carries out the processing as described above with reference to FIG. 5. Here, a case of executing S408 will be referred to as a route A while a case of executing S407 will be referred to as a route B.

In S411, the CPU 5 determines whether or not the paper conveyance processing corresponds to the printing of a final copy. The CPU 5 proceeds to S412 in the case where the paper conveyance processing is determined not to correspond to the printing of the final copy. In the case of not corresponding to the printing of the final copy, the conveyance target positions of the respective pages have been settled in the course of processing the previous copy. Accordingly, the CPU 5 executes the conveyance processing to the conveyance target position settled in the course of processing the previous copy in parallel with the processing to create the data of the next print page to be printed until reaching the conveyance target position. In other words, the CPU 5 creates the data of the next page to be printed during the conveyance to the conveyance target position. Note that this parallel processing only needs to be carried out in parallel at least during a certain period of time, and the points of start and the points of end of the conveyance processing and the data creation processing do not always have to coincide with one another. This parallel processing will be defined as processing Z. Moreover, this parallel processing will be referred to as a route C. Since the conveyance target position is obvious immediately after completion of the print processing of the one page, the conveyance processing in S412 can complete the conveyance processing to the conveyance target position in parallel with creation of the data of the next page to be printed. After completion of the processing Z, the CPU 5 returns to S401.

On the other hand, the CPU 5 proceeds to S413 in the case where the paper conveyance processing is determined to correspond to the printing of the final copy in S411. In S413, the CPU 5 determines whether or not there is the next page to be printed. The paper conveyance processing is terminated in the case where there is not the next page to be printed. This will be referred to as a route D. Meanwhile, in the case where there is the next page to be printed, the CPU 5 proceeds to S412 and carries out the processing Z. The CPU 5 returns to S401 after completion of the processing Z.

In this paper conveyance processing, a leading end position (the print start position) of the next page to be printed is settled in advance. Accordingly, it is possible to further reduce the conveyance time required for paper conveyance between pages by carrying out the processing Z.

FIG. 7 is a table showing a relation between the copy being printed and the type of the paper conveyance operation between the printed pages (that is, any of the route A, the route B, the route C, and the route D in FIG. 6 mentioned above) in the multiple copy printing according to the embodiment. A code N (which is an integer not smaller than 3) indicates the final copy. In this table, a currently printed copy 501 is categorized into any of three categories of a first copy 502, a second to (N−1)-th copy 503, and an N-th copy 504.

In the paper conveyance processing between the printed pages of the first copy 502, the operation in accordance with the route A or the route B in FIG. 6 is carried out in the case where there is the next page. Here, the operation in accordance with the route A or the route B in FIG. 6 is also carried out in the case where there is not the next page.

In the paper conveyance processing between the printed pages of the second to (N−1)-th copy 503, the operation in accordance with the route C in FIG. 6 is carried out in the case where there is the next page. Here, the operation in accordance with the route C in FIG. 6 is also carried out in the case where there is not the next page.

In the paper conveyance processing between the printed pages of the N-th copy 504, the operation in accordance with the route C in FIG. 6 is carried out in the case where there is the next page. On the other hand, the operation in accordance with the route D in FIG. 6 is carried out in the case where there is not the next page.

Figure 8:
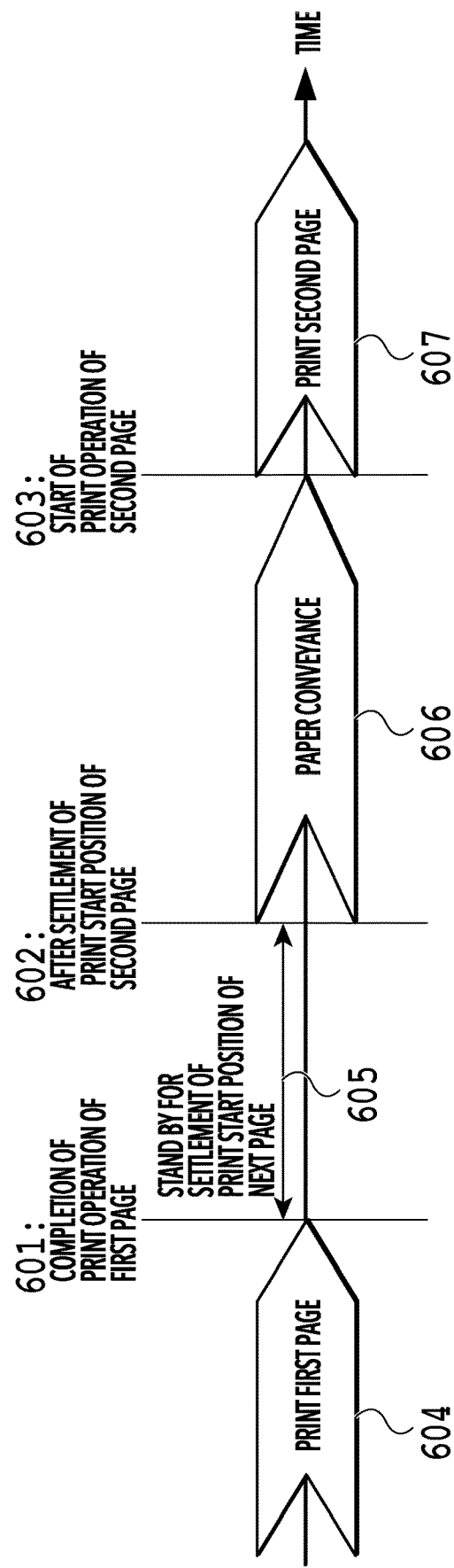
FIG. 8 is a diagram showing an execution sequence of conventional processing between pages.

FIG. 8 is a diagram showing an execution sequence of the conventional processing between pages. Between the pages, after completion of a printing operation 604 of the first page (601), a paper conveyance operation 606 to the print start position of the next page is carried out and then a printing operation 607 of the second page is carried out. The conventional paper conveyance operation 606 will be described later with reference to FIG. 10. However, the paper conveyance operation 606 is started after settlement of the print start position of the second page (602). Accordingly, standby time 605 comes into being before the settlement of the print start position of the second page. As a consequence, a start 603 of a print operation of the second page is delayed, thus leading to deterioration of print throughput.

Figure 9:
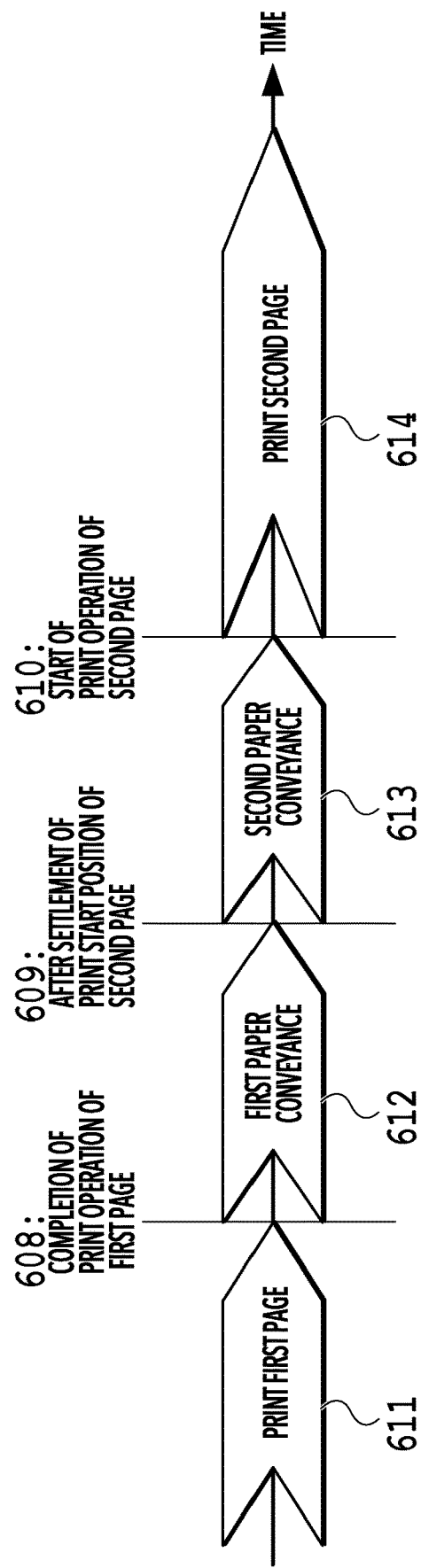
FIG. 9 is a diagram showing an execution sequence of processing between pages according to the embodiment.

FIG. 9 is a diagram showing an execution sequence of the processing between pages in this embodiment. Between the pages, after completion of a printing operation 611 of the first page, two stages of paper conveyance operations (a first paper conveyance operation 612 and a second paper conveyance operation 613) are carried out and then a printing operation 614 of the second page is carried out. In the conventional processing, there is the standby state from a point after completion of the printing operation of the first page (608) to a point after settlement of the print start position of the second page (609). This leads to a delay of a start 610 of a printing operation of the second page. In this embodiment, the rolled paper 101 is conveyed by the predetermined length during a period from the point after completion of the printing operation of the first page (608) to the settlement of the print start position of the second page. As mentioned earlier, the predetermined length is the length which is shorter than the conveyance length (the conveyance distance) in the paper conveyance direction to the point where the print start position of the next page reaches the position of the print head. Although this length may be set in advance, the length is assumed to be set based on the cutting position of the first page in this example. To be more precise, an operation 612 (namely, the first paper conveyance operation) to convey the paper to the cutting position of the first page (that is, the leading end position of the second page) is carried out. Thereafter, an operation 613 (namely, the second paper conveyance operation) to convey the paper after the settlement of the print start position of the second page (609) is carried out. The paper conveyance processing in the processing X of FIG. 5 and FIG. 6 corresponds to the first paper conveyance operation (a first medium conveyance operation). The paper conveyance processing in S310 of FIG. 5 and in S410 of FIG. 6 corresponds to the second paper conveyance operation (a second medium conveyance operation). The first paper conveyance operation and the second paper conveyance operation of this embodiment will be described later with reference to FIG. 11. As described above, in this embodiment, the conventional paper conveyance operation 606 is divided into the first paper conveyance operation 612 and the second paper conveyance operation 613, and the first paper conveyance operation 612 is carried out immediately after completion of the printing operation of the first page. In this way, the start 610 of the printing operation of the second page can take place earlier than the conventional processing and an improvement in print throughput is hence expected.

Figure 10:
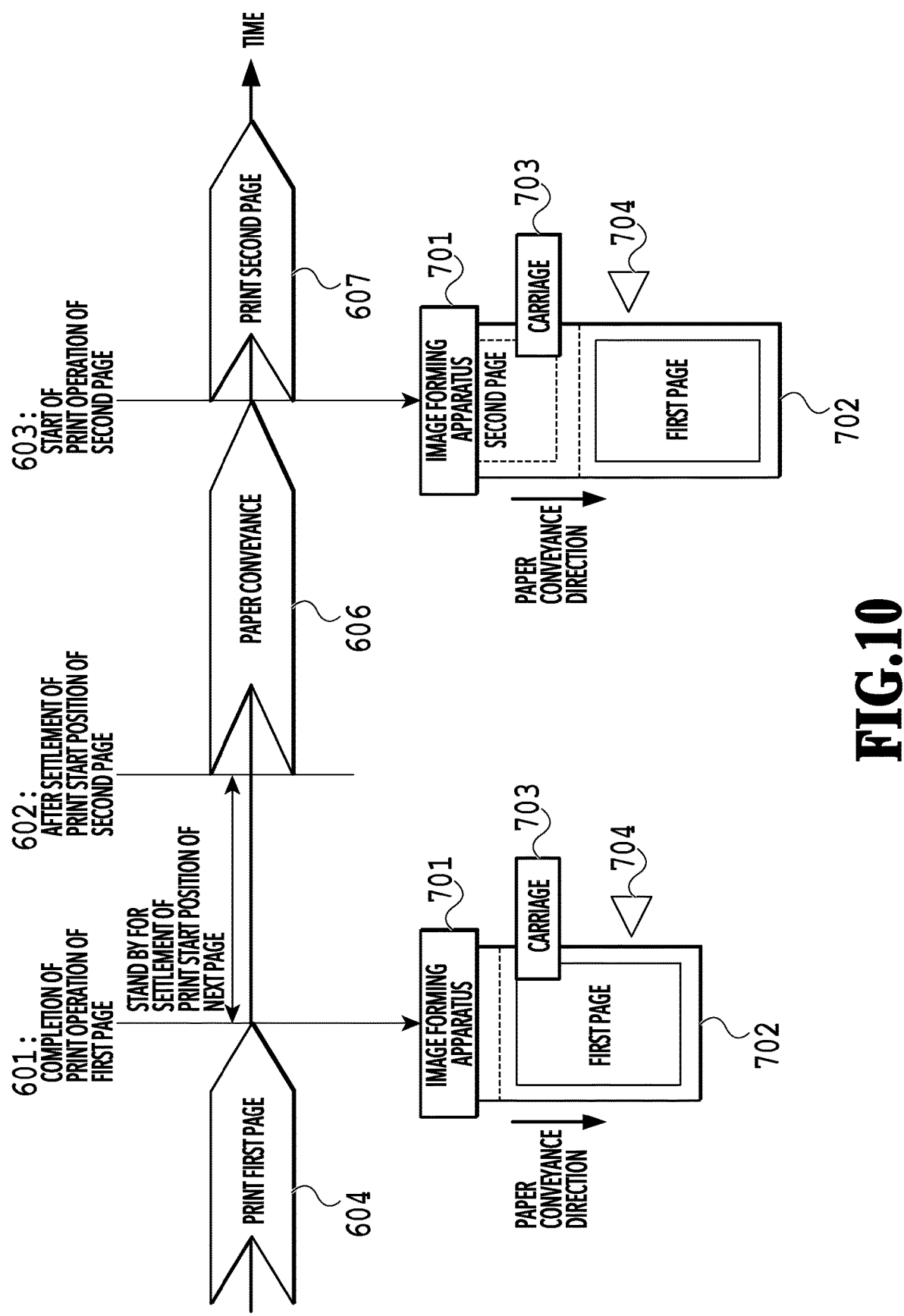
FIG. 10 is a schematic diagram showing conveyance positions of paper at respective timings of the processing in FIG. 8.

FIG. 10 is a diagram showing conveyance positions of the paper at respective timings of the processing in the conventional processing between pages in FIG. 8. In the conventional method, rolled paper 702 on which the first page is printed is discharged from an image forming apparatus 701 after completion of the print operation of the first page (601), and a carriage 703 is located on the last printed line of the first page. Meanwhile, a cutter 704 is present downstream of the carriage 703. In this state, the image forming apparatus 701 is stopped. After settling the print start position of the second page (602), the image forming apparatus 701 carries out the paper conveyance operation 606 in such a way that the most downstream side of the carriage 703 approaches the print start position of the second page. Thereafter, the image forming apparatus 701 starts the printing operation 607 of the second page.

Figure 11:
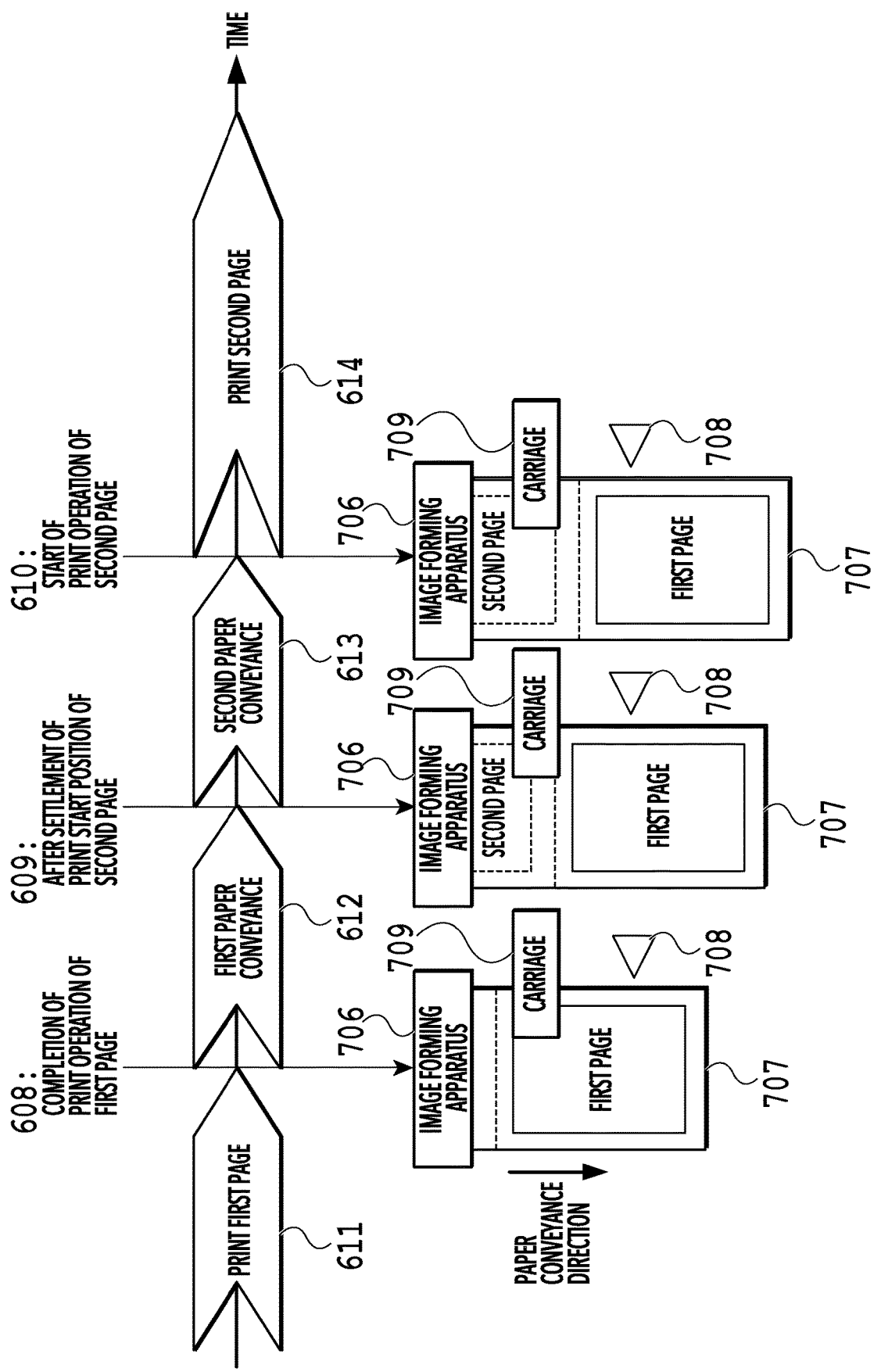
FIG. 11 is a schematic diagram showing conveyance positions of paper at respective timings of the processing in FIG. 9.

FIG. 11 is a diagram showing conveyance positions of the paper at respective timings of the processing in the processing between pages of this embodiment in FIG. 9. In this embodiment, rolled paper 707 on which the first page is printed is discharged from an image forming apparatus 706 after completion of the print operation of the first page (608), and a carriage 709 is located on the last printed line of the first page. Meanwhile, a cutter 708 is present downstream of the carriage 709. The image forming apparatus 706 carries out the first paper conveyance operation to a predetermined position (which is the cutting position of the first page (that is, the leading end position of the second page) in this example) during a period from a point after completion of the print operation of the first page (608) to settlement of the print start position of the second page. Specifically, this is equivalent to conveyance of the paper to such a position that the position of the most downstream nozzle (reference sign h in FIG. 12 to be described later) of the carriage 709 is not located upstream of the print start position (reference sign g in FIG. 12) of the second page. This conveyance is carried out in order to preclude the necessity of conveying the rolled paper 707 in the opposite direction to the paper conveyance direction in the subsequent second paper conveyance operation. As an example of control so as not to locate the print head upstream of the print start position of the second page, the most downstream nozzle (reference sign h in FIG. 12) of the carriage 709 is located at a leading end (reference sign f in FIG. 12) of the second page. However, the control is not limited only to the foregoing. In the processing X in FIG. 5 and FIG. 6, the conveyance position is determined in accordance with the above-described method. After the first paper conveyance operation and the settlement of the print start position of the second page (609), the second paper conveyance operation is carried out in such a way that the most downstream nozzle (reference sign h in FIG. 12) of the carriage 709 is located at the print start position (reference sign g in FIG. 12) of the second page. The determination methods in S309 and S409 and the conveyance positions in S310 and S410 are determined in accordance with the above-described method. Thereafter, the image forming apparatus 706 starts the printing operation 614 of the second page.

Figure 12:
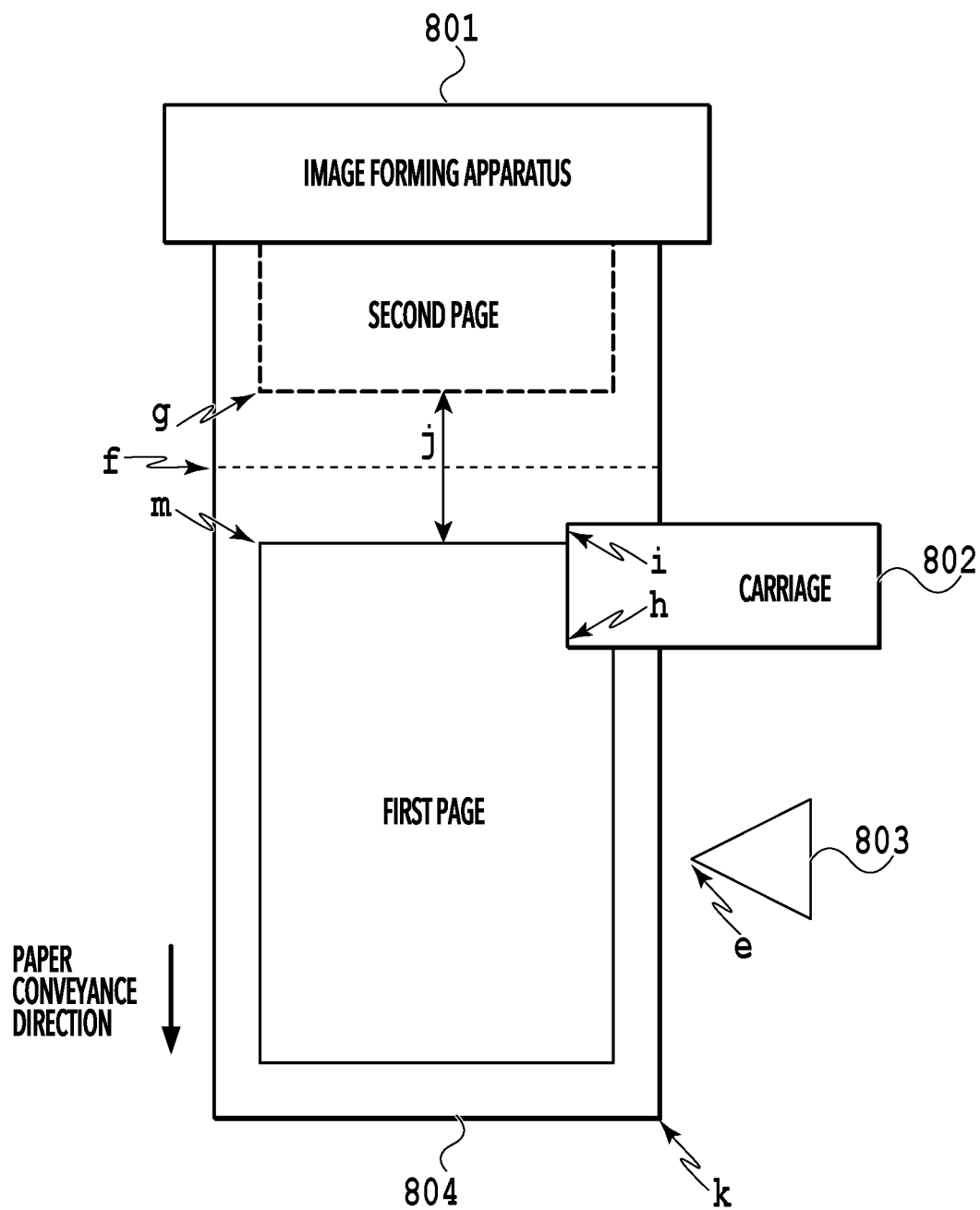
FIG. 12 is a schematic diagram showing a conveyance position of paper immediately after completion of printing a first page according to the embodiment.

FIG. 12 is a schematic diagram showing the conveyance position of the paper immediately after completion of printing the first page according to the embodiment. Rolled paper 804 is discharged from an image forming apparatus 801 immediately after completion of printing the first page, and a carriage 802 is located on the last printed line of the first page. Meanwhile, a cutter 803 is present downstream of the carriage 802. Reference sign e denotes the position of the cutter, reference sign f denotes the leading end position of the second page (that is, the cutting position), reference sign g denotes the print start position of the second page, reference sign h denotes the position of the most downstream nozzle of the carriage 802, and reference sign i denotes a position of the most upstream nozzle of the carriage 802. Meanwhile, reference sign j denotes an amount of margin between the first page and the second page, reference sign k denotes a leading end position of the rolled paper 804, and reference sign m denotes the print end position of the first page.

Figure 13:
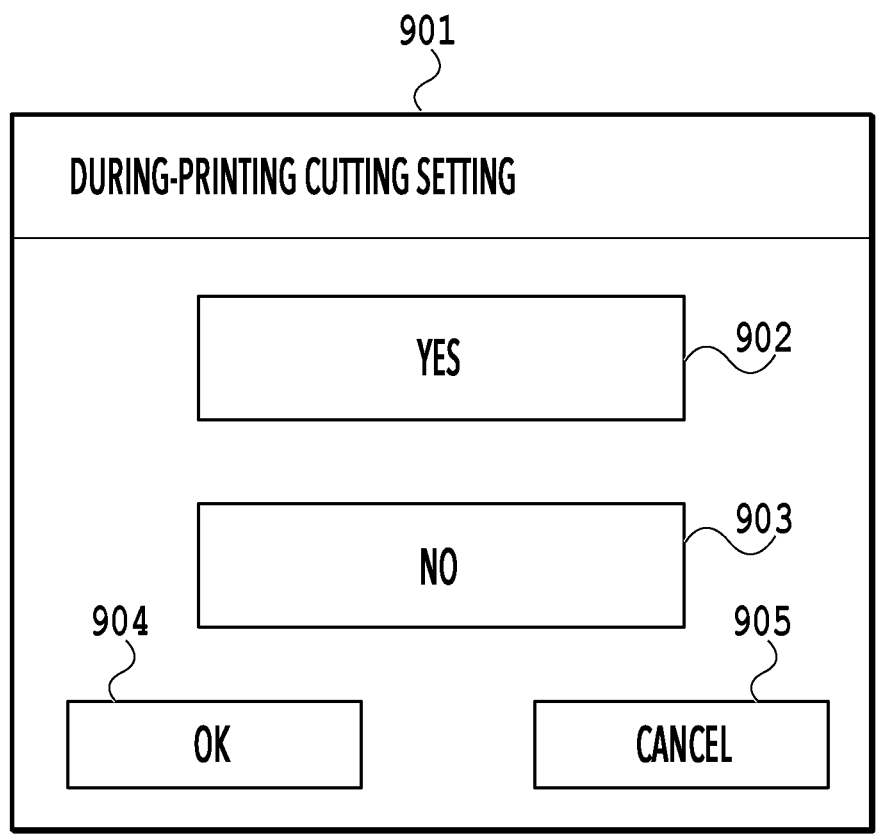
FIG. 13 is a schematic diagram showing an example of an input screen for setting a timing for cutting according to the embodiment.

FIG. 13 shows an example of an input screen for setting a timing for cutting according to the embodiment. An input screen 901 is displayed on the display-operating unit 12. A user selects a button 903 in a case of establishing a setting for carrying out a cutting operation every time the printing of each page is completed, or in other words, in the case of not carrying out the during-printing cutting. On the other hand, the user selects a button 902 in a case of establishing a setting for carrying out a cutting operation in the middle of printing the page, or in other words, in the case of carrying out the during-printing cutting. After selecting the button 902 or the button 903, the user presses an OK button 904 in order to settle a set value. In the case where the OK button 904 is pressed, the set value is stored in the NVRAM 8. On the other hand, in the case of not establishing the setting, the user presses a cancellation button 905. The display-operating unit 12 terminates the display of the input screen 901 in the case where any of the buttons is pressed. Here, the setting for carrying out or not carrying out the during-printing cutting may be conducted by using the externally connected device such as the PC instead. Meanwhile, the setting may be made in accordance with the type of the paper, image quality, and the like.

Figure 14:
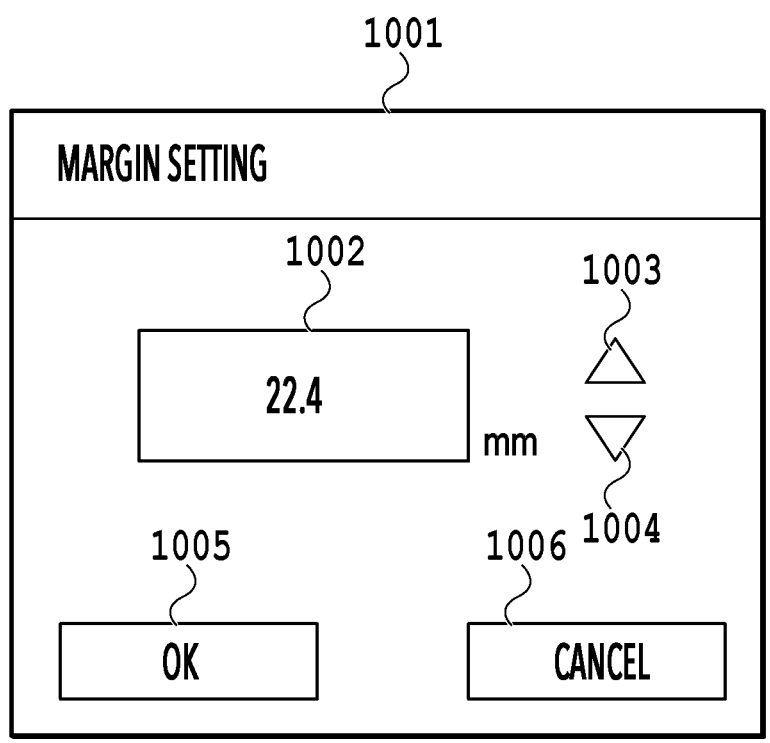
FIG. 14 is a schematic diagram showing an example of an input screen for setting a margin between printed pages according to the embodiment.

FIG. 14 shows an example of an input screen for setting a margin between printed pages according to the embodiment. An input screen 1001 is displayed on the display-operating unit 12. The input screen 1001 displays a set margin amount 1002, and a value of the set margin amount 1002 is changed as the user presses buttons 1003 and 1004. A current set margin amount is displayed as a default amount. Since the current set margin amount is held by the NVRAM 8, the input screen 1001 firstly obtains the current set margin amount from the NVRAM 8 and displays the obtained amount. The set margin amount 1002 is increased in the case where the button 1003 is pressed and the set margin amount 1002 is decreased in the case where the button 1004 is pressed. After changing the set margin amount, the user presses an OK button 1005 in order to settle the set value. In the case where the OK button 1005 is pressed, the set value is stored in the NVRAM 8. On the other hand, the set value is not stored in the NVRAM 8 in the case where a cancellation button 1006 is pressed. The display-operating unit 12 terminates the display of the input screen 1001 in the case where any of the buttons is pressed. Here, the setting of the margin may be conducted by using the externally connected device, for example.

As described above, in this embodiment, the paper is conveyed to the predetermined position after completion of the printing of the one page and before settlement of the print start position of the next page. Subsequently, the paper is conveyed to the print start position of the next page as soon as the print start position of the next page is settled. In this way, an improvement in print throughput is expected.

Note that this embodiment does not have to be carried out in the case of not carrying out the during-printing cutting. A setting for carrying out or not carrying out the during-printing cutting can be made by displaying the input screen 901 shown in FIG. 13 on the display-operating unit 12. Here, the setting for carrying out or not carrying out the during-printing cutting may be made by using the externally connected device, for example. Meanwhile, the setting may be made in accordance with the type of the paper, image quality, and the like.

Moreover, this embodiment intends to improve the throughput by dividing the paper conveyance operation between pages into two sessions. However, the number of division is not limited only to two sessions. For example, in the case where a position to cut out the paper passes through the cutter position in the middle of the second paper conveyance operation, the second paper conveyance operation is divided into two sessions of "conveyance to the cutter position" and "conveyance to the conveyance target position", whereby the conveyance operation between pages is divided into three sessions as a whole. Meanwhile, image data in a PDF format and the like undergoes a step-by-step image analysis. Accordingly, the leading end position of the printing is determined stepwise. As a consequence, the image of this type may be subjected to the paper conveyance upon determination of each leading end position. In this case, the conveyance operation between pages is divided into three or more sessions. An improvement in print throughput is also expected from this mode as with the above-described configuration.

Furthermore, in a case where creation of the print data of the next page is completed before completion of the printing of the one page, the print start position of the next page is settled immediately after completion of the printing of the one page. Accordingly, it is possible to convey the paper to the print start position of the next page in a single conveyance operation immediately after completion of the printing of the one page without having to divide the paper conveyance operation between pages. An improvement in print throughput is also expected from this mode as with the above-described configuration.

Meanwhile, in this embodiment, the processing X can be started immediately after completion of printing of one page. However, a timing to start the processing in S308 or S408 is not limited to the foregoing as long as a period of time from completion of printing of the one page to completion of the processing X is equivalent to or shorter than a period of time from completion of printing of the one page to settlement of the print start position of the next page. An improvement in print throughput is also expected from this mode as with the above-described configuration.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to this disclosure, it is possible to improve print throughput in a case of printing multiple page with an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033414, filed Feb. 28, 2020, which is hereby incorporated by reference herein in its entirety.

What is claimed is:

1. An image forming apparatus configured to print a plurality of pages on a rolled printing medium, comprising:
   a conveyance unit configured to convey the printing medium;
   a printing unit configured to print on the printing medium; and
   a cutting unit configured to cut the printing medium, wherein
   the conveyance unit performs:
      a first conveyance operation to convey the printing medium by a predetermined length in a direction to discharge the printing medium and to stop the conveyance, the first conveyance operation being carried out after completion of printing of one page by the printing unit and before settlement of a print start position of a next page, and
      a second conveyance operation including an operation to convey the printing medium in the direction to discharge until the print start position reaches a position of the printing unit, the second conveyance operation being carried out after settlement of the print start position of the next page.

2. The image forming apparatus according to claim 1, wherein a position of a nozzle on a downstream side of the printing unit is located downstream of the print start position of the next page in a case where the printing medium is conveyed by the predetermined length.

3. The image forming apparatus according to claim 1, wherein
the printing unit includes a carriage provided with a plurality of nozzles each configured to eject an ink, and
a position of the printing unit in a case where the conveyance unit conveys the printing medium is located at a position of a nozzle out of the plurality of nozzles which is located downstream in a medium conveyance direction.

4. The image forming apparatus according to claim 1, wherein
the cutting unit is located downstream in a medium conveyance direction relative to the printing unit, and
the printing unit suspends printing in a case where a leading end position of the next page reaches a position of the cutting unit during printing of the next page, and resumes the printing of the next page after the cutting unit cuts off the printing medium.

5. The image forming apparatus according to claim 1, wherein in a case of printing a plurality of copies, the conveyance unit conveys the printing medium based on the print start position settled in a course of processing a previous copy.

6. The image forming apparatus according to claim 1, wherein the conveyance unit determines whether or not to carry out the first conveyance operation depending on conveyance time spent until a leading end position of the next page reaches a position of the printing unit and on time spent until settlement of a conveyance target position.

7. The image forming apparatus according to claim 6, wherein the conveyance unit carries out the first conveyance operation in a case where a conveyance speed of the printing medium is equal to or higher than a predetermined value.

8. The image forming apparatus according to claim 6, wherein the conveyance unit carries out the first conveyance operation in a case where an amount of margin between pages is less than a predetermined value.

9. The image forming apparatus according to claim 6, wherein the conveyance unit carries out the first conveyance operation in a case where resolution of the next page is equal to or higher than a predetermined value.

10. The image forming apparatus according to claim 6, wherein the conveyance unit carries out the first conveyance operation in a case where a value indicating print quality of the next page is equal to or higher than a predetermined value.

* * * * *